D. H. THORN.
EXCAVATOR.
APPLICATION FILED FEB. 24, 1919.

1,365,748.

Patented Jan. 18, 1921.
3 SHEETS—SHEET 1.

Inventor
D. H. THORN.

D. H. THORN.
EXCAVATOR.
APPLICATION FILED FEB. 24, 1919.

1,365,748.

Patented Jan. 18, 1921.
3 SHEETS—SHEET 2.

Inventor
D. H. THORN.

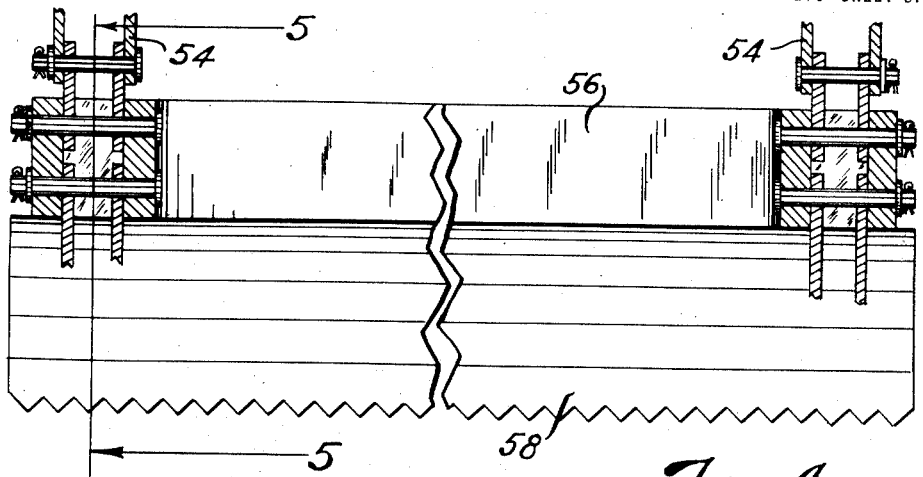
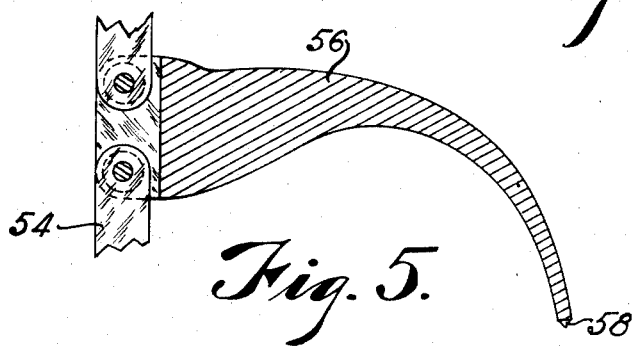
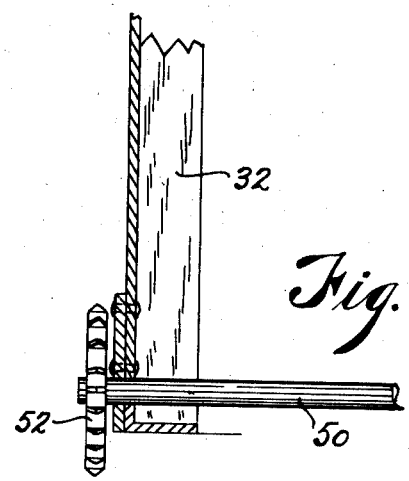

UNITED STATES PATENT OFFICE.

DAWSON H. THORN, OF JONESBORO, ARKANSAS.

EXCAVATOR.

1,365,748.　　　　Specification of Letters Patent.　　Patented Jan. 18, 1921.

Application filed February 24, 1919. Serial No. 278,637.

*To all whom it may concern:*

Be it known that I, DAWSON H. THORN, a citizen of the United States, residing at Jonesboro, county of Craighead, and State of Arkansas, have invented certain new and useful Improvements in Excavators; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to excavators, and particularly to devices for digging graves, although it may be used for ditches, trenches and the like.

The object of the invention is to provide a device carrying its own power, which will excavate to the required depth and then be capable of forward movement to lengthen the excavation already formed.

Briefly, the invention comprises a chassis, upon which is mounted a frame work or shafting in which a frame carrying the excavating means is vertically movable. The top of the frame work is connected with a winch for raising and lowering the digging frame. The digging element is preferably an endless movable excavator carrying a plurality of shovels or scoops, the top of the frame being equipped with a chute into which the contents of the scoops is discharged. The power plant carried by the digging frame is provided with means for transmitting power to the wheels on the chassis at will in order that the chassis may be moved forward gradually after a hole of the required depth has first been dug.

In the drawings:

Fig. 4 is a detailed section taken on line 4—4 of Fig. 3, to show one of the shovels or scoops and its mounting on the endless chain carrier.

Fig. 5 is a section indicated by line 5—5 of Fig. 4; and

Fig. 6 is a sectional detail indicated by line 6—6 of Fig. 3, with the endless excavator and the driving chain for the excavator omitted.

Figure 1:
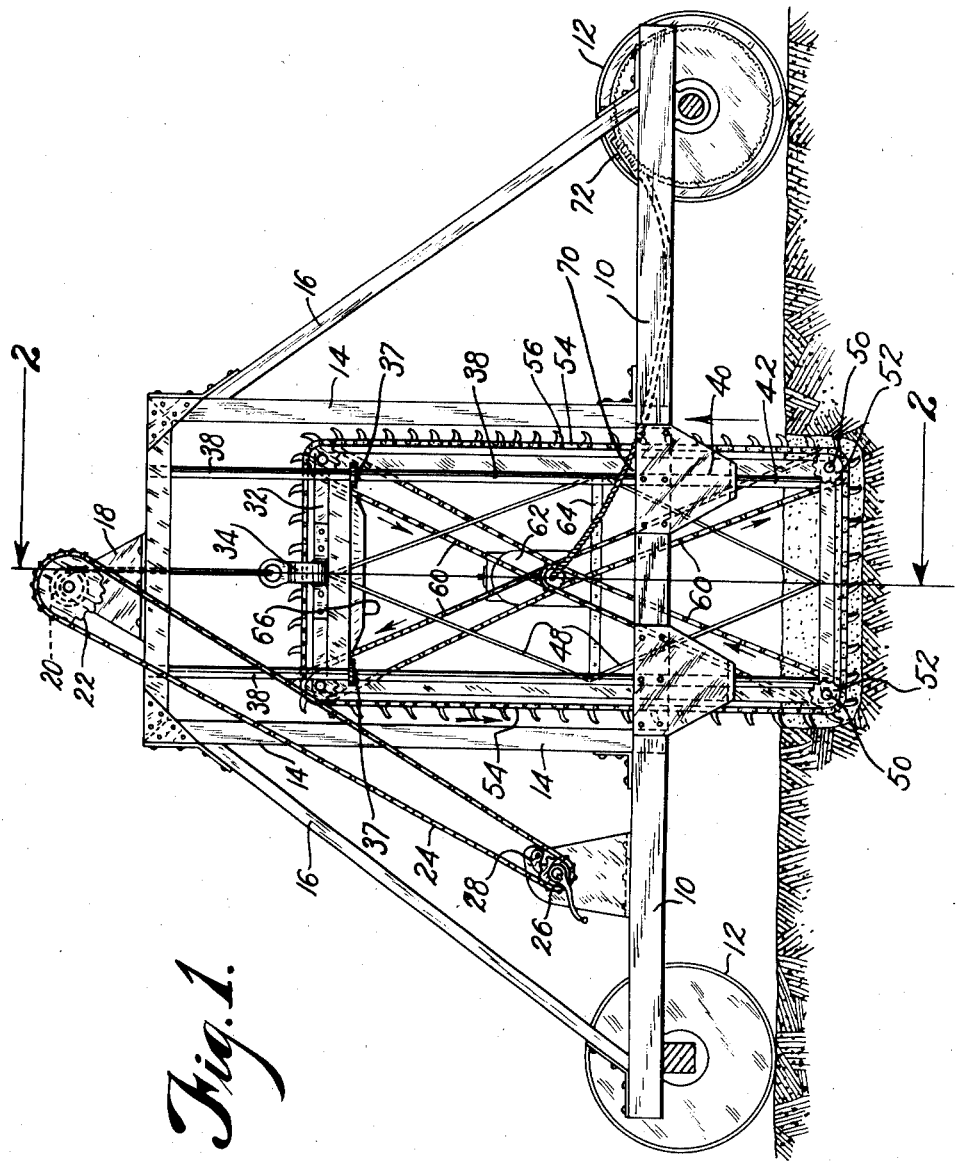
Figure 1 is a side elevation of the invention, as indicated by line 1—1 of Fig. 2.
Figure 2:
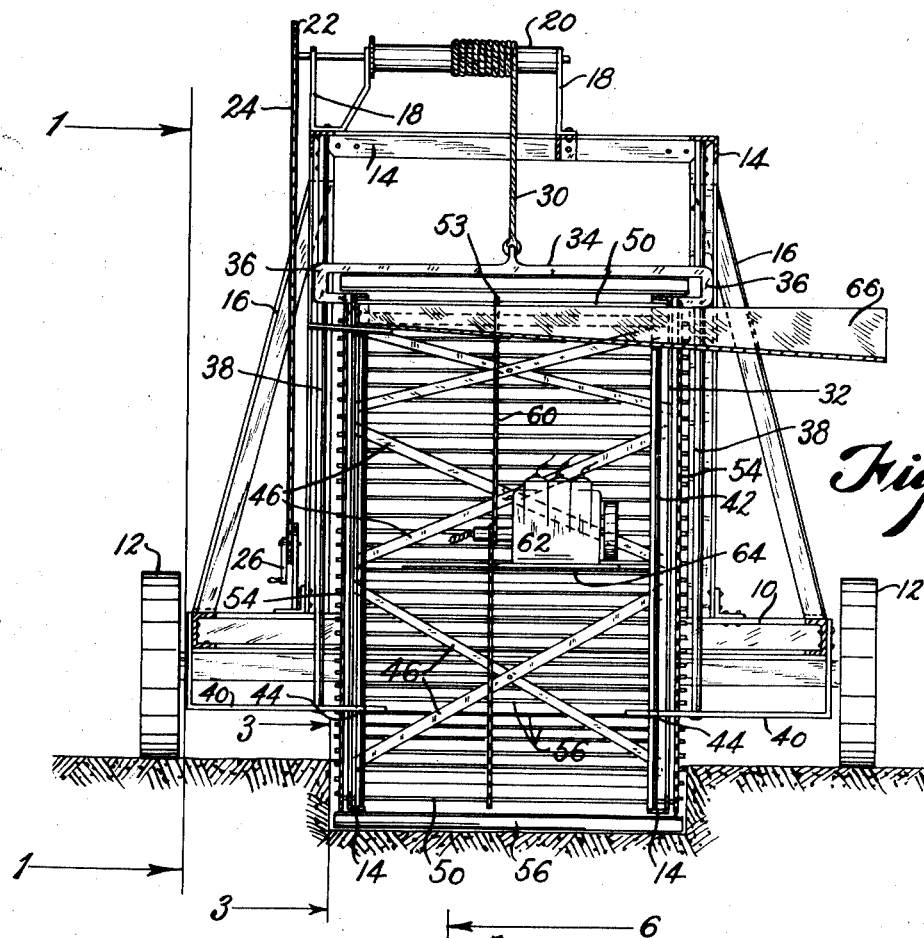
Fig. 2 is a vertical section indicated by line 2—2 of Fig. 1.
Figure 3:
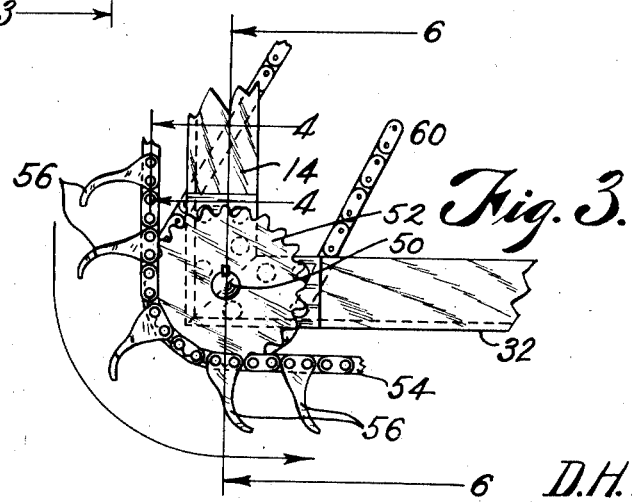
Fig. 3 is a detail, taken on line 3—3 of Fig. 2.

A chassis 10, provided with wheels 12, has a vertically-extending frame work or shaft mounted thereupon and braced by means of the bracing arms 16. Brackets 18 on the top of the frame work 14 support a winch 20, this winch being driven by sprocket 22 and chain 24 from the crank 26, reverse movement of which is controlled by ratchet 28, as shown.

A cable 30 wound upon the winch 20 supports the digger frame 32 through the medium of a looped yoke 34, the bowed-out side portions 36 being provided to accommodate the endless digging device hereinafter described.

Mounted upon the sides of the digging frame 32 are apertured ears 37, these ears slidably receiving rods 38 whose upper ends are mounted at the top of the frame work 14 and whose lower ends are fixed in brackets 40, extending inwardly from the chassis 10. Rods 42, secured to the top and bottom of the digger frame, 32, are slidably received at 44 by the inner extremities of the brackets 40. These rods 38 and 42 guide the digger frame in its vertical movements. The frame 32 is suitably braced throughout by means of braces 46 and 48, as shown.

Mounted at each of the four corners of the frame 32 are drive shafts 50 on which are mounted sprockets 52 and 53. Sprockets 52 drive the digger chain 54, which carries the shovels or scoops 56. The latter may be provided with toothed forward edges, as shown at 58 in Fig. 4, and the base of each of these scoops forms one of the links of the digger chain.

Connected with the sprockets 53 are driving chains 60, these being driven from a motor 62 of any suitable type mounted upon a platform 64 within the digger frame 32. Any suitable connection, such as sprockets, is used to drive the chains 60.

In order to propel the chassis when desired, a flexible driving shaft 70 is connected with the motor 62 by any suitable means such as a clutch (not shown), and with the forward wheels by means of a worm drive 72, as indicated, or any other satisfactory connection.

In the operation of the device, the motor 62 is set in operation, thereby driving the endless digger chain 54 with its scoops 56. The frame 32 is gradually lowered through the medium of crank 26 and winch 20, and when the desired depth of excavation has been reached, the flexible drive shaft 70 is slidably connected with the engine 62 and the entire device is gradually moved forward, thereby digging out one of the walls of the excavation, this process being continued until the excavation has reached the desired length.

The dirt carried up by the scoops is discharged into a chute 66, mounted in the upper part of the digger frame 32 and inclined downward slightly as indicated. The vibration of the machine while in operation is sufficient to discharge the excavated dirt from this chute.

I claim:

1. An excavator, comprising a chassis, a frame work supported on said chassis, a frame supported in said frame work for vertical movement therein, means to raise and lower said frame, movable excavating means on said frame, and a power device mounted in said frame to drive said movable excavating means.

2. An excavator, comprising a chassis, a frame work mounted on said chassis, a frame supported from said frame work for vertical movement therein, said frame comprising a looped yoke at the top thereof, a cable attached to said yoke for supporting the frame from the top of the frame work, and an endless excavator movable about said frame and through said yoke.

3. An excavator, comprising a chassis, a frame work mounted on said chassis, a frame supported from said frame work for vertical movement therein, said frame comprising a looped yoke at the top thereof, a cable attached to said yoke for supporting the frame from the top of the frame work, an endless excavator movable about said frame and through said yoke, and a power device mounted in said frame and connected with said endless excavator to move the same.

4. An excavator, comprising a chassis, a frame work mounted on said chassis, a frame supported from said frame work for vertical movement therein, said frame comprising a looped yoke at the top thereof, a cable attached to said yoke for supporting the frame from the top of the frame work, an endless excavator movable about said frame and through said yoke, rods mounted on said chassis and frame work and slidably connected with said frame, and rods on said frame, slidably connected with said chassis to guide the movement of said frame.

In testimony whereof I affix my signature.

DAWSON H. THORN.